Feb. 2, 1932. S. B. HOWE 1,843,157
STAINING APPARATUS
Filed Feb. 18, 1929 2 Sheets-Sheet 2

INVENTOR
SMITH B. HOWE
By J.W. Ellis
ATTORNEY

Patented Feb. 2, 1932

1,843,157

UNITED STATES PATENT OFFICE

SMITH B. HOWE, OF BUFFALO, NEW YORK, ASSIGNOR TO WEATHERBEST STAINED SHINGLE COMPANY, INC., OF NORTH TONAWANDA, NEW YORK, A CORPORATION OF NEW YORK

STAINING APPARATUS

Application filed February 18, 1929. Serial No. 340,851.

My invention relates in general to a staining apparatus and in particular to an apparatus whereby wooden products and particularly shingles may be stained by hand dipping or otherwise.

The principal object of my invention has been to provide an apparatus in which the stain shall be so thoroughly agitated and recirculated that the color pigments used therein will be maintained in suspension, and various oils and vehicles which may be used in such stain be prevented from becoming separated.

Another object has been to provide a device in which the stain may be more thoroughly penetrated into the fibers of the wood, thus permitting the addition of certain ingredients which will prolong the life of the stain and the wooden products impregnated therewith.

Moreover my device is such that the production of stained wooden products will be increased, and more uniform results attained.

Moreover, my device, because of its temperature control, is more comfortable and agreeable to the workman, which aids in increasing the production of the product.

The above objects and advantages have been accomplished by the device shown in the accompanying drawings, of which:

Figure 1:
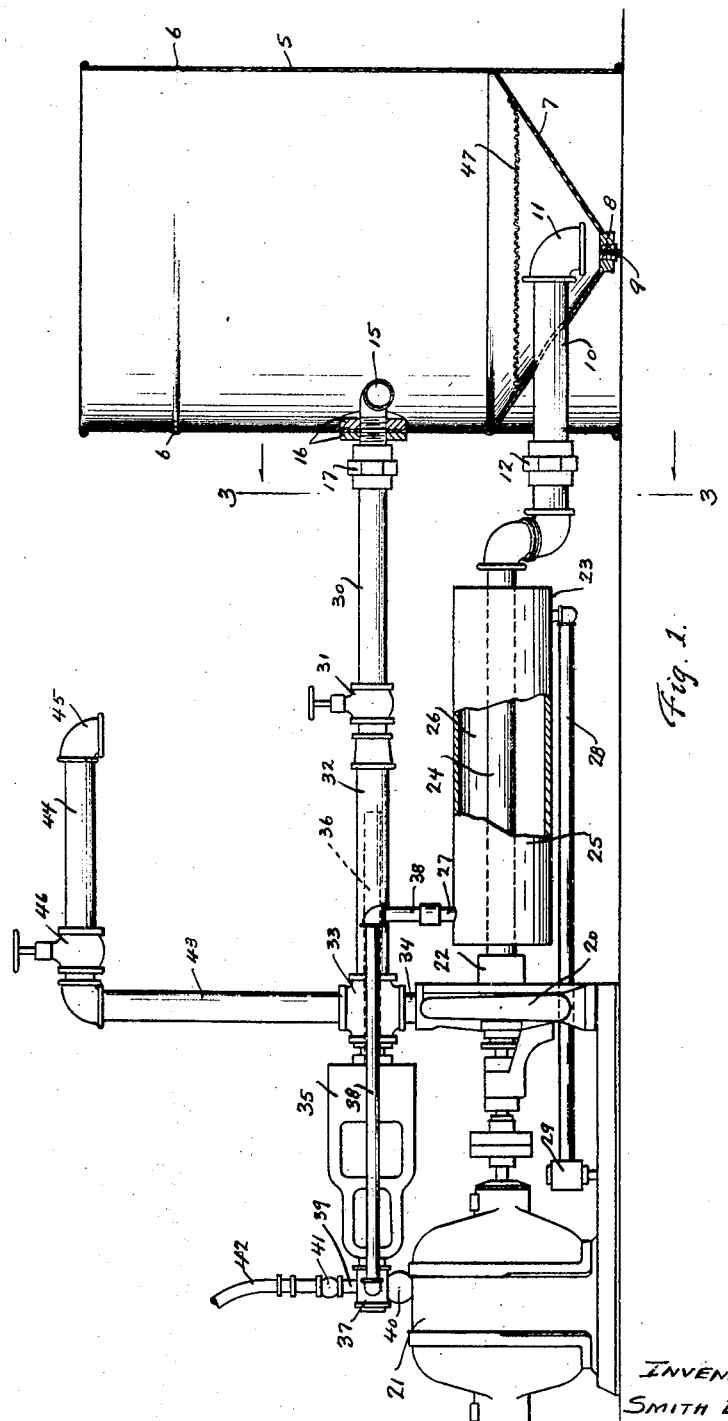
Fig. 1 is a side elevation of my complete device, showing the dipping tank in section and the heater partly in section.

My device comprises a dipping tank 5 which is open at the top and into which the wooden products may be dipped by hand or otherwise. The dipping tank, of course, contains the stain and the level thereof is preferably maintained at substantially the point 6 which is indicated by a bead formed in the side wall of the tank. The side wall of the tank is extended to the floor whereby it is supported. A bottom 7 is provided near the lower end of the side wall 5 of the tank and this bottom is preferably conical in shape, as shown. The angle of the conical bottom may be made to suit the kind of pigment used in the stain, and is preferably of a degree substantially the same or slightly greater than the angle of repose of the pigment, so that even if precipitation did occur, the pigment would be deposited at the center or the apex of the conical bottom. The bottom is suspended a slight distance above the floor line and is provided at its apex with a central opening 8 in which a plug 9 is secured. This provides a clean-out opening. Passing through the side wall of the tank 5 and through the bottom 7 is an outlet pipe 10 which is sealed at the point where it passes through the bottom 7 so that there can be no leakage of the stain. The pipe is provided at its inner end with an elbow 11. The pipe is of such a length that the free end of the elbow is at the center of the bottom and this end is projected downwardly so that it lies near the apex of the bottom. The outer end of the outlet pipe is provided with a union connection 12 for attachment to other parts of the device to be hereinafter described. The tank is also provided with an inlet connection which is preferably in the form of a street elbow 15. This elbow is screwed into flanges 16 secured one to the inside and the other to the outside wall of the tank. This elbow has its outlet end arranged so as to project the flow of stain in substantially a tagential direction, and the axis of its outlet end is inclined slightly in a downward direction, so that a helical circulation of the liquid will be produced. Connected to the outer flange 16 is a union 17 which is connected to other parts of the apparatus to be hereinafter described.

Figures 2, 3:
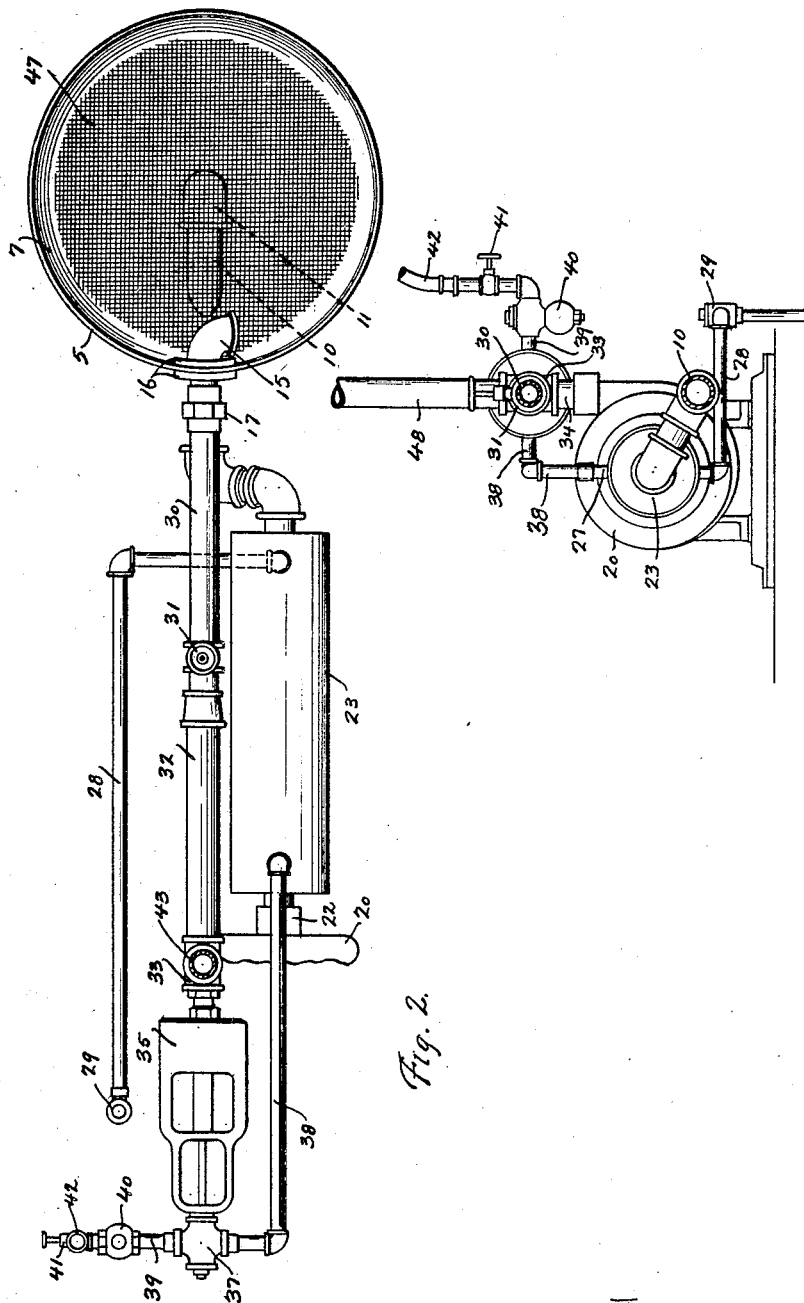
Fig. 2 is a fragmentary, plan view of the same with portions omitted for clearness of illustration.
Fig. 3 is a sectional elevation, taken on line 3—3 of Fig. 1.

In order to produce circulation of the stain through the tank, I use a centrifugal pump 20 of standard manufacture and drive the pump preferably by means of a direct connected electric motor 21. For clearness of illustration the pump 20 and motor 21 have been omitted in Fig. 2. The union 12 secured to the outer end of the outlet pipe 10 of the dipping tank is connected to the suction side 22 of the pump 20 through a heater 23. This heater comprises a centrally arranged pipe 24 which forms part of the piping connecting the union 12 and the suction 22 of the pump, and an outer jacket 25 thus providing a steam space 26. A steam inlet pipe 27 is provided for the heater, and a steam outlet pipe 28 is also provided. The steam outlet pipe is, of course, connected with a suitable steam trap 29. An inlet pipe is provided which comprises a section 30 and a section 32 larger in diameter than the section 30. A valve 31 is connected in this pipe. The enlarged section 32 of the pipe is connected to a cross-fitting 33 which is carried by the outlet pipe 34 of the pump 20. Carried by the connection of the cross-fitting 33 which is opposite the pipe 32 is a temperature controlling device 35, having its control element 36 located within the enlarged section 32 of the inlet pipe, so that it will be controlled by the temperature of the fluid being delivered to the dipping tank. At the outer end of the temperature controlling device is a steam valve 37, which is controlled by the actuation of the regulator. One side of this control valve is connected by means of piping 38 to the steam inlet 27 of the heater whereby the quantity of steam delivered to the heater will be controlled in accordance with the desired predetermined temperature of the staining liquid. Connected also to the valve 37 is the steam supply pipe 39 which may have a steam strainer 40 connected in the line. A steam connection 42 leads to a suitable source of steam supply. This connection may be either a permanent pipe or a flexible steam hose, and a valve 31 is connected therein.

Connected to the upper end of the cross-fitting 33 is a stand pipe 43 which extends up to a point above the level of the stain in the tank 6. This pipe is preferably formed with a horizontal portion 44 having an elbow 45 at its extreme outer end and being provided with a valve 46. The purpose of this stand pipe is to empty the stain from the tank when desired.

Arranged in the conical bottom 7 of the tank and preferably just above the outlet pipe 10 is a strainer 47 which is preferably of a suitable wire mesh, and serves to prevent foreign matter, largely chips from wooden products from being drawn into the centrifugal pump 20.

It is obvious that when the pump is operated, the stain will be drawn from the lowermost point of the conical bottom 7 where any precipitation which may occur will be drawn into the outlet elbow 11 and conducted through the heater 23 to the suction side of the pump 20. From the discharge side of the pump the fluid will be forced back through the inlet pipe 30, past the element 36 of the temperature regulator, and back to the dipping tank where it is projected from the inlet elbow 15 in a tangential and slightly downward direction. Such continuous circulation of the stain prevents precipitation and where the stain is composed of various oils and vehicles, such thorough agitation will also prevent the oils from becoming separated. As the fluid passes over the element 36 of the regulating device, its temperature will serve to control such element which will cause the regulator to permit the required amount of steam to pass through the heater to bring the temperature up to and maintain it at the predetermined degree. By heating the stain, its viscosity is lowered, and not only is production increased thereby, since the stain will readily drain from the wooden products, but the drying action is accelerated and a more uniformly coated product results, since streaked effects are eliminated.

Obviously, some modifications of the details herein shown and described may be made without departing from the spirit of my invention or the scope of the appended claim, and I do not, therefore, wish to be limited to the exact embodiment herein shown and described, the form shown being merely a preferred embodiment thereof.

Having thus described my invention, what I claim is:

The combination with a staining apparatus of a dipping tank formed with a shallow, conically-shaped bottom, the lower portion thereof providing a sump, a fixed liquid inlet secured to the tank below the middle thereof and discharging close to its inner wall, such inlet being disposed in a tangential direction and being tipped downwardly, a screen arranged between the inlet and the sump and a liquid outlet arranged in the conically shaped bottom and having a downwardly pointing elbow, such elbow being arranged above the sump.

In testimony whereof, I have hereunto signed my name.

SMITH B. HOWE.